Feb. 20, 1940.    E. E. MOYER    2,190,756
ELECTRIC CONTROL SYSTEM
Filed April 17, 1937    3 Sheets-Sheet 1

Inventor:
Elmo E. Moyer,
by Harry E. Dunham
His Attorney.

Feb. 20, 1940.  E. E. MOYER  2,190,756
ELECTRIC CONTROL SYSTEM
Filed April 17, 1937   3 Sheets-Sheet 2

Fig. 3.

Inventor:
Elmo E. Moyer,
by Harry E. Dunham
His Attorney.

Patented Feb. 20, 1940

2,190,756

UNITED STATES PATENT OFFICE 2,190,756

ELECTRIC CONTROL SYSTEM

Elmo E. Moyer, Scotia, N. Y., assignor to General Electric Company, a corporation of New York Application April 17, 1937, Serial No. 137,525

10 Claims. (Cl. 171—119)

My invention relates to electric control systems and more particularly to electric valve control systems for dynamo-electric machines of the synchronous type.

There has been an ever increasing application of synchronous machines in electric power generating, transmission and distribution systems. Coincidentally with this widespread application of synchronous machines, attention has been directed to the problem of increasing the power limits of the machines to improve the stability of the associated electric power systems.

In view of these factors there has been evidenced a decided need for arrangements to increase the steady state power limits of synchronous machines so that the machines may operate to supply overloads without falling out of synchronism with the associated system. Moreover, it is important that the synchronous machines be capable of assuming the increase in load in practical simultaneity with such increase so that the continuity of service is not disturbed.

It is an object of my invention to provide a new and improved control system for dynamo-electric machines.

It is another object of my invention to provide a new and improved electric valve system for increasing the steady state power limit of dynamo-electric machines of the synchronous type.

It is a further object of my invention to provide a new and improved electric valve translating system.

In accordance with the illustrated embodiments of my invention, I provide improved electric valve control systems shown as applied to arrangements for increasing the steady state power limit of dynamo-electric machines of the synchronous type. In particular, I provide electric valve circuits for supplying direct current to the armature windings of a dynamo-electric machine to cause said machine to operate higher up on the saturation curve, thereby increasing the steady state power limit of the machine. As will be understood in view of the various embodiments described hereinafter, this control of the dynamo-electric machine to increase the steady state power limit may be accomplished in a variety of ways. The electric valve apparatus may be permanently connected to the armature windings and the direct current supplied to the armature windings may be controlled by controlling the conductivity of the electric valve means or the electric valve means may be controlled by apparatus connected in the anode-cathode circuit to control the current supplied to the armature windings. A circuit controlling means such as a switching device may be interposed between the armature windings and the electric valve means to connect selectively and disconnect the electric valve means to accomplish the control of the magnetic condition of the core member in accordance with machine or circuit conditions.

In one embodiment of my invention one group of electric valve means is connected to the machine terminals and to the field winding to supply direct current to the field winding and to the armature windings, and a second group of electric valve means is associated with the first group and with the machine to control the component of direct current supplied to the armature windings in accordance with the alternating component of current in the armature windings.

My copending patent application Serial No. 158,559 filed August 11, 1937 is a division of this application and discloses and broadly claims certain features of the electric valve circuits shown in this application.

For a better understanding of my invention, reference may be had to the following description taken in connection with the accompanying drawings, and its scope will be pointed out in the appended claims.

Figure 1:
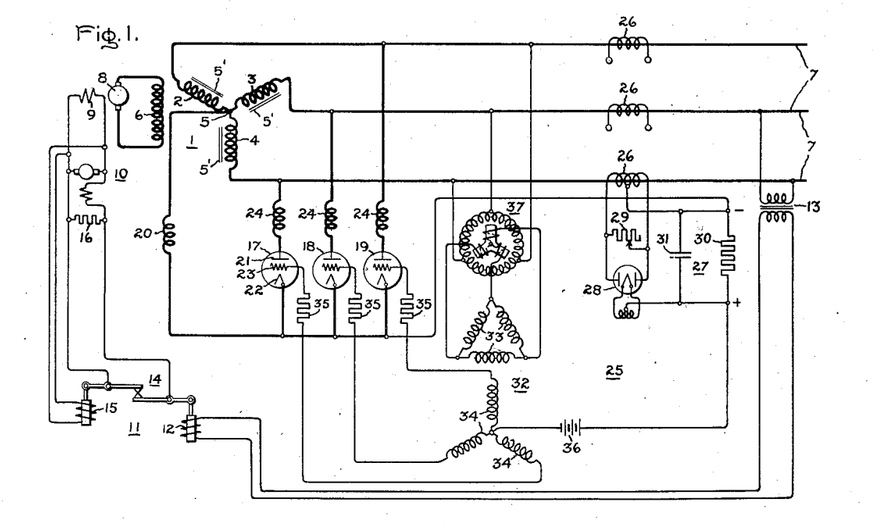
Fig. 1 of the accompanying drawings diagrammatically illustrates my invention as applied to a dynamo-electric machine of the synchronous type in which a controlled rectifier supplies current to the armature windings.

Fig. 1 of the accompanying drawings diagrammatically illustrates an embodiment of my invention as applied to a dynamo-electric machine 1 of the synchronous type having armature phase windings 2, 3, and 4 provided with a neutral connection 5, an associated core member or structure 5' and a relatively movable field winding 6. The armature windings 2, 3 and 4 are connected to an alternating current circuit 7 which may function as either a supply circuit or a load circuit. An exciter is connected to the field winding 6 to supply direct current thereto and includes an armature member 8 and a field winding 9. A sub-exciter 10 may be employed to control the energization of the field winding 9 of the main exciter.

An excitation system 11 is associated with the main exciter and the sub-exciter 10 to control the energization of the field winding 6 in accordance with an electrical condition such as the voltage of the alternating current circuit 7 or in accordance with the terminal voltage of the armature windings of the dynamo-electric machine 1. While for the purpose of explaining my invention I have chosen to represent the excitation system as being of the vibratory type, it should be understood that I may employ any other conventional voltage regulating device for controlling the energization of the field winding 6 in accordance with a predetermined electrical condition. The excitation system 11 may include a voltage responsive coil 12 energized from the alternating current circuit 7 through a transformer 13, a system of vibratory cooperating contacts 14 and an actuating coil 15 which is responsive to the armature voltage of the sub-exciter 10. It will be understood by those skilled in the art that the actuating coil 12 may be made responsive to polyphase voltage conditions of the alternating current circuit 7 so that the excitation system 11 of machine 1 may be properly controlled under unbalanced operating conditions. The excitation system serves to intermittently short circuit a resistance 16 connected in the field circuit of the sub-exciter 10 to control the voltage thereof in accordance with the voltage of the circuit 7.

In order to supply direct current to armature windings 2, 3 and 4 of dynamo-electric machine 1 to cause the machine to operate higher up on the saturation curve, I provide a plurality of electric valve means 17, 18 and 19 which are connected between different armature windings and the neutral connection 5 thereof through a smoothing inductive reactance 20. The electric valve means 17, 18 and 19 are preferably of the type employing an ionizable medium such as a gas or a vapor and each includes an anode 21, a cathode 22 and a control member 23 for controlling the conductivity of the associated discharge path. Smoothing inductive reactance 24 may also be connected in series relation with the electric valve means 17, 18 and 19. As an agency for controlling the conductivities of the electric valve means 17, 18 and 19 in accordance with a predetermined electrical condition of the alternating current circuit 7 or in accordance with a predetermined electrical condition of the armature windings 2, 3 and 4 of machine 1, I provide a control circuit 25 which is responsive to the current of the alternating current circuit 7. A suitable inductive device such as a current transformer 26 may be associated with each of the conductors of the circuit 7 to provide an alternating voltage which varies in accordance with the current, and a circuit 27 is used to provide a unidirectional voltage which varies in accordance with the current of the alternating current circuit 7. The circuit 27 may include a full wave rectifying device 28, an adjustable resistor 29 connected across the terminals of the current transformer 26, an impedance element such as a resistance 30 and a capacitance 31 connected in parallel relation with the resistance 30. It will be understood by those skilled in the art that the control of the electric valves 17, 18 and 19 may be made responsive to polyphase conditions of the alternating current circuit 7; for example, the currents in the various conductors of circuit 7 may be summated or integrated by well known arrangements to control the electric valves 17, 18 and 19 in accordance with the polyphase current conditions. To impress on control members 23 of electric valve means 17, 18 and 19 alternating voltages adjustable in phase, I employ a transformer 32 having primary windings 33 and secondary windings 34 which are connected to control members 23 through current limiting resistances 35. Connected in series relation with the resistance 30, I employ a suitable source of negative unidirectional biasing potential such as a battery 36 which introduces in the control circuit 25 a potential which acts in opposition to the voltage provided by the resistance 30 and the associated circuit 27. The magnitude of the potential provided by battery 36 may be chosen so that it is sufficiently large to maintain the electric valve means 17, 18 and 19 nonconductive within a predetermined range of current in the circuit 7, and the circuit 27 may be energized to provide a voltage to render ineffective or neutralize the potential of battery 26 when the current of circuit 7 increases beyond a predetermined value, so that the conductivities of electric valves 17, 18 and 19 are controlled to supply a unidirectional component of current to armature windings 2, 3 and 4 of machine 1 in accordance with the alternating component of current of the armature windings. Any suitable phase shifting arrangement, as a rotary phase shifting device 37, may be employed to control the phase of the alternating voltage introduced in control circuit 25 by transformer 32.

The operation of the embodiment of my invention diagrammatically shown in Fig. 1 will be explained by considering the system when the dynamo-electric machine 1 is operating as a synchronous generator to supply alternating current to the circuit 7. Let it be assumed that the control circuit 25 is adjusted so that the unidirectional biasing potential provided by the battery 36 is sufficiently great to maintain the electric valve means 17, 18 and 19 nonconductive within a predetermined range of current transfer between the armature windings 2, 3 and 4 of machine 1 and the alternating current circuit 7. As the current varies within this range of values, the excitation system 11 will respond to control the energization of field winding 6 so that the voltage of the alternating current circuit 7 is maintained at a predetermined value. If it be assumed further that the current supplied by the machine 1 increases to a value above said predetermined range of values, the voltage appearing across the terminals of resistance 30 will become sufficiently large so that the resultant unidirectional voltage acting in the control circuit 25 is reduced to render electric valves 17, 18 and 19 conductive at a predetermined time during the respective positive half cycles of anode voltage to produce unidirectional components of current in the armature windings 2, 3 and 4. The rotary phase shifter 37 may be adjusted so that the alternating voltages introduced in the control circuit 25 have a predetermined lagging relationship relative to the voltages impressed on anodes 21 of electric valve means 17, 18 and 19 so that as the resultant unidirectional voltage acting in circuit 25 becomes less negative the conductivities of electric valves 17, 18 and 19 will be correspondingly increased to control the direct current supplied to armature windings 2, 3 and 4 in accordance with the alternating component of current in these windings.

It is understood that the steady state power output of a dynamo-electric machine of the synchronous type is directly proportional to the product of the terminal voltage, the voltage corresponding to the field current and the sine of the electrical displacement angle between these two voltages and is inversely proportional to the synchronous reactance of the machine. This general statement represents the power of the machine neglecting the double frequency component of power due to the difference in the reactances in the direct and quadrature axes of the machine. However, for general purposes the above relationship defines the power with sufficient accuracy. Since the maximum power output of the machine occurs when the derivative of the power with respect to the displacement angle is zero, the maximum power output is obtainable when the displacement angle is slightly less than ninety electrical degrees.

Figure 2:
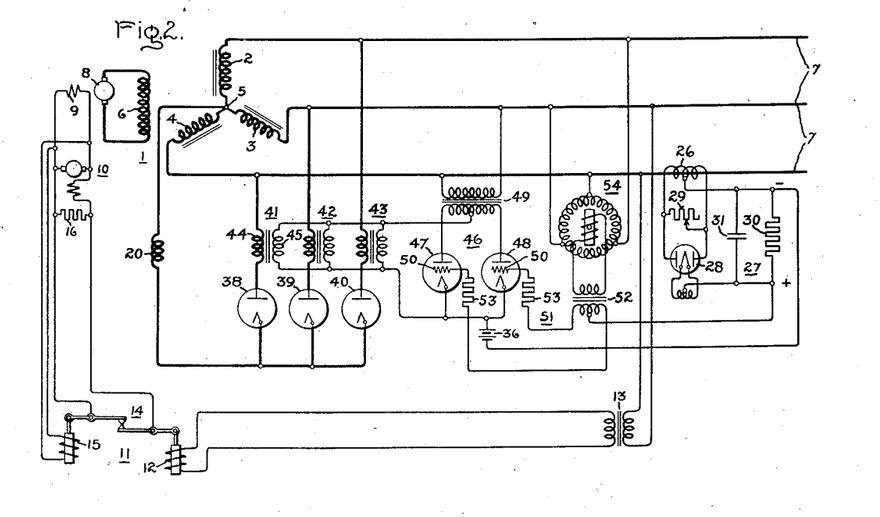
Figs. 2, 3 and 4 diagrammatically show other embodiments of my invention in which the control of the current transmitted to the armature windings is effected by electric valve means differently arranged.

The arrangement of Fig. 2 is similar to that of Fig. 1 and corresponding elements have been assigned like reference numerals. In this figure there is disclosed another embodiment of my invention in which direct current is supplied to the armature windings by means of electric valves 38, 39 and 40, preferably of the type employing an ionizable medium such as a gas or a vapor, and which are associated with controlling means such as saturable reactors 41, 42 and 43 for controlling the impedance of the respective anode-cathode circuits of these valves. Each of the saturable reactors 41, 42 and 43 may include a winding 44 connected in series with the associated electric valve and a control winding 45 which controls the impedance of the series winding 44. An electric valve circuit 46 including electric valves 47 and 48, which may be energized from any suitable source of alternating current, is employed to supply direct current to control windings 45 of saturable reactances 41, 42 and 43 in accordance with the current of the alternating current circuit 7, or in accordance with the current of armature windings 2, 3 and 4 of machine 1. In the particular arrangement shown in the drawings, the electric valve circuit 46 is shown as being energized from the circuit 7 through a transformer 49, and it is to be understood that the circuit 46 may be energized from any other suitable source of current. Electric valves 47 and 48 are provided with control members 50 which are energized by a control circuit 51 including a transformer 52 which impresses alternating voltages on the control members 50 through current limiting resistances 53. The transformer 52 may be energized through any suitable phase shifting arrangement such as a rotary phase shifter 54.

The operation of the embodiment of my invention diagrammatically shown in Fig. 2 is substantially the same as the operation of the embodiment of my invention shown in Fig. 1. Let it be assumed that machine 1 is operating as a synchronous generator to transmit energy to the alternating current circuit 7 and let it be assumed that the circuit 51 is adjusted so that the current supplied to control windings 45 of saturable reactors 41, 42 and 43 by circuit 46 is substantially zero within a predetermined range of current in the alternating current circuit 7. Under these conditions, the impedance of the series windings 44 of saturable reactors 41, 42 and 43 will be relatively large so that there will be practically no unidirectional current in the armature windings 2, 3 and 4 of machine 1. As the current of the circuit 7 or as the current of the machine 1 increases to a value beyond this range of values, the voltage provided by resistance 30 of circuit 27 will be increased to effect a reduction in the negative potential acting in circuit 51 to increase the conductivities of electric valves 47 and 48, causing these valves to supply current to control windings 45 of the saturable reactors 41, 42 and 43. As a result, the impedance of the series windings 44 will be decreased thereby permitting the electric valves 38, 39 and 40 to supply a relatively large component of direct current to the armature windings of machine 1, causing the machine 1 to operate higher up on the saturation curve and producing thereby an increase in the steady state power limit of machine 1. It is to be understood that the excitation system 11 will under all conditions respond to control the energization of the field winding 6 to maintain the terminal voltage of machine 1 substantially constant.

Figure 3:
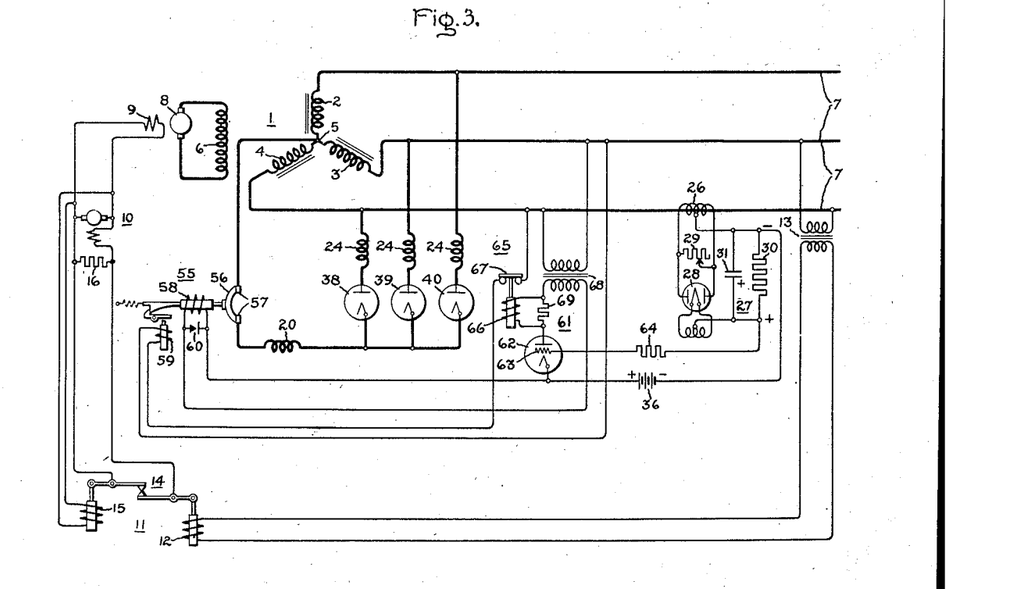

Referring now to Fig. 3 of the accompanying drawings, there is diagrammatically represented another embodiment of my invention for effecting control of the steady state power limit of dynamo-electric machine 1 in which a circuit controlling means is interposed between the electric valve means and the armature windings of the machine selectively to open and close the electric valve circuit. Various elements in the arrangement shown in Fig. 3 correspond to elements shown in Figs. 1 and 2 and have been assigned like reference numerals.

In order to effect selective control of the unidirectional component of current in the armature windings 2, 3 and 4 of machine 1, I employ a suitable circuit controlling means such as a circuit interrupter 55 including a movable contact member 56 biased to the open circuit position, stationary contacts 57, a closing coil 58 and a tripping coil 59. A suitable unidirectional conducting device such as a contact rectifier 60 may be connected in parallel with the closing coil 58 to assure that the closing coil of circuit interrupter 55 is energized with only current of a predetermined polarity. In order to effect energization of the closing coil 58 to establish a unidirectional component of current in the armature windings 2, 3 and 4 when the current of the alternating current circuits 7 increases beyond a predetermined value, I employ a circuit 61 including a controlled electric valve 62 preferably of the type employing an ionizable medium and having a control member 63 which is energized in accordance with the difference in the voltage provided by the battery 36 and the circuit 27. A current limiting resistance 64 may be connected in series relation with the control member 63 of electric valve 62. A relay 65 having an actuating coil 66 and an armature member 67 is connected in series relation with the trip coil 59 of the circuit interrupter 55 to prevent energization of the trip coil so long as the electric valve 63 is conductive. The electric valve 62 may be energized from any siutable source of alternating current, such as the circuit 7, through a transformer 68. A resistance 69 is connected in series relation with the electric valve 62 to provide a voltage sufficient to raise arm 67 when electric valve 62 is conductive.

The operation of the arrangement of my invention shown in Fig. 3 will be considered when the machine 1 is operating as a synchronous generator to supply current to the circuit 7. The excitation system 11 will operate to control the energization of the field winding 6 so that the terminal voltage of machine 1 is maintained at a substantially constant value. Let it be assumed that the circuit 27 is adjusted to provide a voltage such that the unidirectional negative biasing potential provided by the battery 36 predominates to impress a negative potential on the control member 63 of electric valve 62 to maintain the electric valve 62 nonconductive within a predetermined range of current of the circuit 7. Under these conditions the circuit interrupter 55 will be maintained in the open circuit position so that no direct current is supplied to the armature windings 2, 3 and 4 of machine 1. If the current of the circuit 7 increases beyond a predetermined value or, in other words, if alternating current supplied by armature windings 2, 3 and 4 of machine 1 increases by a predetermined value, the positive voltage provided by resistance 30 will predominate, impressing on control member 63 of electric valve 62 a positive voltage to render electric valve 62 conductive. The voltage appearing across the terminals of resistance 69 will be sufficient to raise the armature member 67 of relay 65 to interrupt the circuit for the tripping coil 59 and the current supplied by circuit 61 will energize the closing coil 58 of circuit interrupter 55 to connect electric valves 38, 39 and 40 to the neutral connection 5 of the armature windings of machine 1. As a result thereof, a unidirectional component of current of a predetermined magnitude established by the design of the associated circuit will be established in armature windings 2, 3 and 4 to cause the machine to operate higher up on the saturation curve. If the current of the circuit 7 or of the armature winding of machine 1 decreases below the predetermined value, the negative biasing potential provided by battery 36 will predominate over the positive voltage provided by resistance 30 to render electric valve 62 nonconductive, thereby effecting deenergization of the closing coil 58 and closing relay 65 to trip circuit interrupter 55 by energizing the trip coil 59. In this manner the system operates selectively to open and close the circuit including electric valves 38, 39 and 40 to control the steady state power limit of the machine in accordance with the current in circuit 7 or in accordance with the current in the armature windings.

Figures 4, 4A:
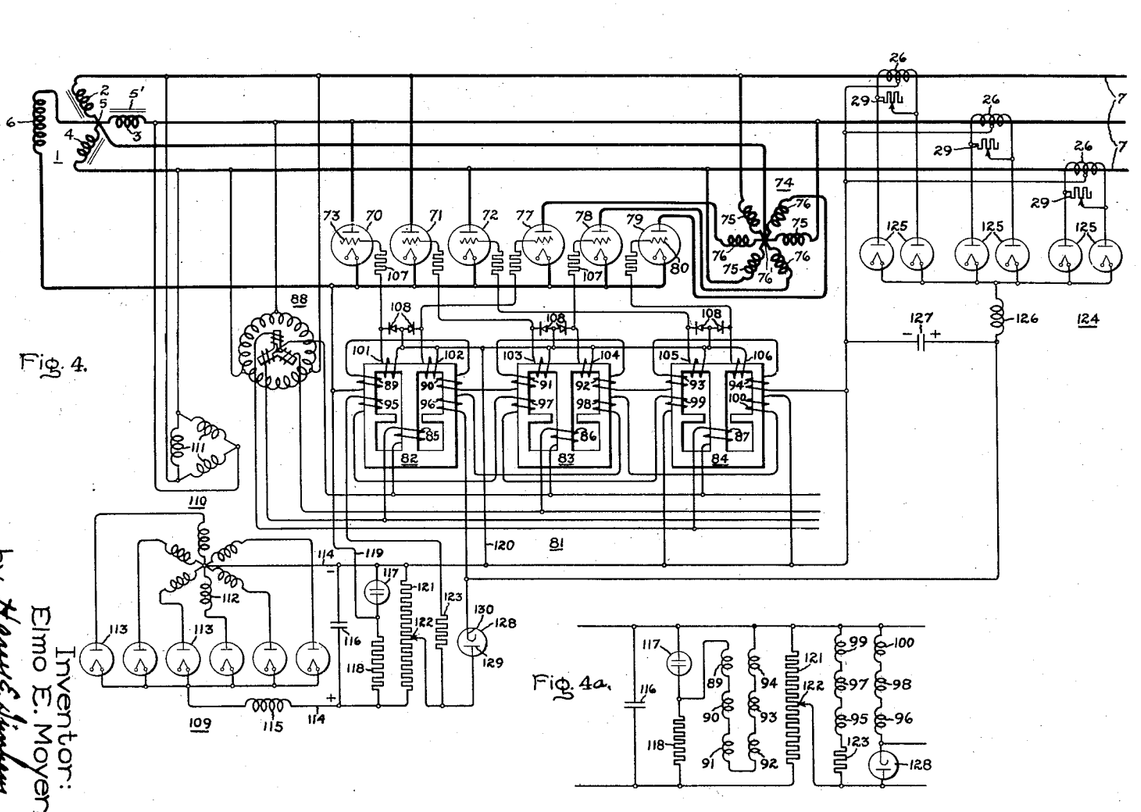
Fig. 4a shows a simplified diagrammatic circuit corresponding to Fig. 4.

Referring now to Fig. 4 of the accompanying drawings, there is diagrammatically shown another embodiment of my invention for controlling the steady state power limit of a dynamo-electric machine of the synchronous type. One group of electric valve means comprising electric valves 70, 71 and 72 is connected across the terminals of the armature windings 2, 3 and 4 and to one terminal of the field winding 6. The other terminal of the field winding 6 is connected to the electrical neutral connection 5 of the armature windings. Each of the electric valves 70, 71 and 72 is provided with a control member 73 for controlling the conductivity of the associated discharge path and electric valves 70, 71 and 72 are preferably of the type employing an ionizable medium such as a gas or a vapor. In order to provide a system of voltages 180 electrical degrees out of phase with the terminal voltages of armature windings 2, 3 and 4, I provide an inductive network 74 comprising windings 75, which are connected to the terminals of armature windings 2, 3 and 4, and a plurality of windings 76 having output terminals which are connected to a second group of electric valves 77, 78 and 79. The inductive network 74 is also provided with a neutral terminal 76′ which is connected to the neutral connection 5 of armature windings 2, 3 and 4. The electric valves 77, 78 and 79 are also preferably of the type employing an ionizable medium such as a gas or a vapor and each includes a control member 80 for controlling the conductivity of the associated discharge path. The cathodes of electric valves 77, 78 and 79 are connected to the cathodes of electric valves 70, 71 and 72.

I provide a control circuit 81 for impressing on the control members 73 of electric valves 70, 71 and 72 and control members 80 of electric valves 77, 78 and 79 alternating voltages variable in phase to maintain the voltage of armature windings 2, 3 and 4 at a substantially constant value and for controlling the electric valves to supply direct current to the armature windings when the load of the machine 1 increases beyond a predetermined value. The control circuit 81 comprises a plurality of inductive devices 82, 83 and 84, each of which includes a core member arranged to provide two control voltages. Inductive device 82 is associated with electric valves 70 and 77; inductive device 83 is associated with electric valves 71 and 78, and inductive device 84 is associated with electric valves 72 and 79. Inductive devices 82, 83 and 84 are provided with exciting windings 85, 86 and 87, respectively, which are energized each in accordance with the voltage of one phase of the three phase alternating current circuit. This source of alternating current may be derived from any suitable source and in the arrangement shown in the drawings is obtained from the alternating current circuit 7 through any conventional phase shifting arrangement such as the rotary phase shifting device 88. The inductive devices 82, 83 and 84 are also provided with unidirectional biasing windings 89, 90; 91, 92; 93, 94, respectively. These windings serve to impress on the associated core members unidirectional magnetomotive forces of substantially constant value. The inductive devices 82, 83 and 84 are also provided with unidirectional biasing windings 95, 96; 97, 98; 99, 100, respectively. The latter mentioned windings are arranged on the respective core members of inductive devices 82, 83 and 84 to oppose the effect of the unidirectional magnetic biasing windings 89-94, inclusive. Control windings 101, 102; 103, 104; 105, 106, are associated with inductive devices 82, 83 and 84 respectively, to provide alternating voltages variable in phase to control the conductivities of the associated electric valve means. Current limiting resistances 107 may be connected in series relation with the associated control members. Unidirectional conducting devices 108 are connected across the control windings associated with each of the inductive devices 82, 83 and 84 to short circuit the control winding which is providing a negative voltage in order to assure that the winding producing a positive voltage is interlinked with a sufficient flux to provide the desired positive voltage. If desired, the core members of inductive devices 82, 83 and 84 may be arranged so that the voltages induced in the control windings are of a peaked wave form.

I provide a voltage sensitive circuit 109 comprising a transformer 110 having primary windings 111 connected to the terminals of the armature windings 2, 3 and 4 and having a plurality of secondary windings 112. A rectifier comprising a plurality of electric valves 113 serves to provide a source of unidirectional voltage 114 the magnitude of which varies in accordance with the voltage of armature windings 2, 3 and 4. A smoothing inductance 115 may be connected in series relation with the associated secondary windings 112 and the electric valves 113 and a capacitance 116 is connected across the output circuit of the rectifier. In order to provide a substantially constant unidirectional voltage, I provide a serially connected glow discharge valve 117 and resistance 118 which are connected in parallel with the capacitance 116. The voltage appearing across the glow discharge valve 117 supplies a control current of substantially constant magnitude to biasing windings 89—94 of inductive devices 82, 83 and 84 and also serves to impress a negative unidirectional biasing potential of substantially constant value on control members 73 of electric valves 70, 71 and 72 and on control members 80 of electric valves 77, 78 and 79 through a circuit including a conductor 119, a conductor 120 and the associated control windings. A voltage divider including a resistance 121 having an adjustable contact 122 is connected in parallel with the serially connected glow discharge valve 117 and resistance 118 and serves to provide an adjustable voltage which varies in accordance with the voltage of the armature windings of the machine 1 to energize biasing windings 95, 97 and 99 of inductive devices 82, 83 and 84, respectively, to control the conductivities of electric valves 70, 71 and 72 in accordance with the voltage of the armature windings. A resistance 123 may be connected in series relation with the adjustable contact 122 of the voltage divider and biasing windings 95, 97 and 99.

I provide a current or load responsive circuit 124 including a plurality of current responsive devices such as current transformers 26 and associated rectifiers 125 for providing a unidirectional voltage, the magnitude of which varies in accordance with the current of the three phases of the alternating current circuit 7, or in accordance with the current of the three phases of the armature windings of machine 1. A smoothing reactor 126 may be connected in series relation with the rectifiers 125 and a capacitance 127 may be connected across the output circuit of the rectifiers 125 to serve as an energy storage device. The positive terminal of capacitance 127 is connected to the movable contact 122 of the voltage divided through a unidirectional conducting device 128 having an anode 129 and a cathode 130. The positive terminal of capacitance 127 is also connected to biasing windings 96, 98 and 100 of inductive devices 82, 83 and 84 to control the energization of these windings in accordance with the current or load of the alternating current circuit 7 or in accordance with the current or load of the machine 1.

Before explaining the general prinicples of operation of the embodiment of my invention diagrammatically shown in Fig. 4, the operation of the various individual circuits will be explained. Considering the electric valves 70, 71, 72, 77, 78 and 79, it will be understood by those skilled in the art that when these valves are of the type employing an ionizable medium the control members are effective to maintain the electric valves nonconductive and that after the valves have been rendered conductive by impressing on the control members a sufficiently positive voltage, the electric valves may be rendered nonconductive only by impressing on the associated anodes a potential sufficiently negative relative to that of the cathode for a time equal to or greater than the time of deionization of the valves. The voltages impressed on the control members 73 of electric valves 70, 71 and 72 and control members 80 of electric valves 77, 78 and 79 comprise a unidirectional negative biasing potential of substantially constant value provided by the glow discharge valve 117 and the alternating voltages of peaked wave form provided by control windings 101—106, of inductive devices 82, 83 and 84. Considering one of the inductive devices in particular, as for example inductive device 82, it is to be understood that the voltages provided by control windings 101 and 102 are 180 eletrical degrees out of phase with respect to each other, and that these voltages tend to render the associated electric valves 70 and 77, respectively, conductive during intervals displaced 180 electrical degrees. Biasing windings 95, 97 and 99 of inductive devices 82, 83 and 84, respectively, are arranged to oppose the magnetomotive forces established by windings 89, 91 and 93 to control the phase of the alternating voltages of peaked wave form induced in control windings 101, 103 and 105 in accordance with the magnitude of the armature voltage of machine 1. Windings 89—94, inclusive, establish in the respective core members of inductive devices 82, 83 and 84 unidirectional magnetomotive forces tending to advance the phase of the control voltages provided by control windings 101—106 to the "full-on" position. Upon increase in armature voltage of machine 1, the incident increase in energization of windings 95, 97 and 99 will effect a retardation in phase of the voltages induced in control windings 101, 103 and 105 to decrease the conductivities of electric valves 70, 71 and 72 and to thereby effect a decrease in the energization of the field winding to return the armature voltage of machine 1 to the predetermined value to be maintained. In like manner the energization of windings 96, 98 and 100 of inductive devices 82, 83 and 84 will control the phase of the voltages induced in control windings 102, 104 and 106 to control the conductivities of electric valves 77, 78 and 79 within a predetermined range of current or load of the machine 1 or of the alternating current circuit 7.

It is to be understood that the voltage sensitive circuit 109 will provide a unidirectional voltage the magnitude of which varies in accordance with the voltages of the three phases of the armature windings of machine 1, or in accordance with the voltage of the alternating current circuit 7. By virtue of the characteristics of the glow discharge valve 117, the voltage appearing across its terminals will be substantially constant and by the proper adjustment of the movable contact 122 of the voltage divider there is provided means to obtain a component of voltage of the output circuit 114 which varies in accordance with the voltage of machine 1.

Within a predetermined range of current supplied by the machine 1 to the alternating current circuit 7, the electric valves 70, 71, 72, 77, 78 and 79 will be controlled to operate as a six-phase rectifier to supply unidirectional current to the field winding 6 to maintain the armature voltage at a substantially constant value, and no unidirectional component will exist in the armature windings 2, 3 and 4 since the current is conducted from the neutral connection 5 of these windings to the neutral terminal 76' of the inductive network 74 through the neutral connection. However, as the current supplied to the alternating current circuit 7 increases beyond a predetermined value, the voltage supplied by the circuit 124 increases to a value sufficiently great to render the cathode 130 of electric valve 128 positive relative to the anode 129, so that beyond this value of current the energization of windings 96, 98 and 100 of inductive devices 82, 83 and 84 is increased to retard in phase the control voltages of windings 102, 104 and 106 to render electric valves 77, 78 and 79 conductive for progressively smaller intervals during each cycle. Within this range of current transfer where the voltages impressed on control members 80 of electric valves 77, 78 and 79 is progressively retarded in phase, it is to be understood that the rate at which the saturation of the core member is accomplished relative to the current of the armature windings may be controlled by adjustment of the movable contact 122 of the voltage divider and by the adjustment of other features of the control circuit 81. At a second predetermined value of current transfer above the first value, it will be understood that by virtue of the increase in voltage of capacitance 127 and incident energization of windings 96, 98 and 100, the voltages impressed on control members 80 of electric valves 77, 78 and 79 will be retarded sufficiently to maintain these electric valves nonconductive so that the electric valves 70, 71 and 72 operate as a three phase half wave rectifier. For values of current above the second predetermined value, electric valves 77, 78 and 79 are controlled predominantly in accordance with the current. Under this condition of operation, an appreciable direct current is conducted through armature windings 2, 3 and 4 to cause said machine to operate higher up on the saturation curve and to increase the steady state power limit of machine 1.

The simplified diagram of Fig. 4a will be of assistance in explaining the general principles of operation of the embodiment shown in Fig. 4. The elements of the circuit of Fig. 4a have been assigned reference numerals corresponding to the respective elements of Fig. 4. Within a predetermined range of current transfer, the system will respond to control the energization of the field winding 6 in accordance with the armature voltage of machine 1 or in accordance with the voltage of the alternating current circuit 7 since control windings 95—100, inclusive, are connected to be energized in accordance with a unidirectional voltage which varies in accordance with the voltage to be regulated, that is, connected to be energized in accordance with a predetermined component of the voltage appearing across resistance 121 of the voltage divider. So long as the current transmitted does not exceed a predetermined value to increase the voltage of capacitance 127 too greatly, the voltage provided by resistance 121 through movable contact 122 will control the energization of windings 96, 98 and 100 of inductive devices 82, 83 and 84 in accordance with the voltage of the circuit. In other words, the electric valves 77, 78 and 79 as well as electric valves 70, 71 and 72 will be controlled in accordance with the armature voltage of machine 1. However, as the current transmitted exceeds the predetermined range of values, the voltage impressed on control members 80 of electric valves 77, 78 and 79 will be retarded in phase to decrease the conductivities of these valves. During this state of operation, the voltage of the machine 1 will be maintained at a constant value by virtue of the control of electric valves 70, 71 and 72 through windings 95, 97 and 99 of inductive devices 82, 83 and 84. As the current transmitted obtains a second predetermined value above the range of values, the windings 96, 98 and 100 will be energized to retard in phase the voltages impressed on control members 80 of electric valves 77, 78 and 79 so that these valves are maintained nonconductive. Under this condition of operation the electric valves 70, 71 and 72 control the energization of the field winding 6 of machine 1 to maintain the armature voltage thereof at a substantially constant value and since these valves are operating as a half wave rectifier, the unidirectional component of current conducted through windings 2, 3 and 4 will cause the machine to operate higher up on the saturation curve, effecting thereby a material increase in the steady state power limit of the machine.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a polyphase alternating current circuit, a dynamo-electric machine of the synchronous type having a polyphase armature winding connected thereto and being provided with an electrical neutral connection, an associated core member and a relatively movable field winding, an excitation system for controlling the energization of said field winding in acccordance with the voltage of said armature winding, a plurality of electric valve means connected between different phases of said armature winding and said neutral connection for establishing a unidirectional component of current in said winding, a plurality of saturable reactors each connected in series relation with a different one of said electric valve means for controlling the current conducted by said electric valve means and each including a control winding for controlling the impedance of said saturable reactors, and means responsive to the current of said armature winding for controlling the current supplied to said control winding to effect control of the unidirectional current in said armature winding.

2. In combination, a polyphase alternating current circuit, a dynamo-electric machine of the synchronous type having a plurality of phase windings connected thereto and being provided with an electrical neutral connection, an associated core member and a relatively movable field winding having a pair of terminals one of which is connected to said neutral connection, a group of electric valve means each being connected to a different one of said phase windings and to the other terminal of said field winding, an inductive network comprising a plurality of windings connected to said phase windings and having output terminals for providing a system of voltages 180 electrical degrees out of phase with the terminal voltages of said phase windings and a neutral terminal connected to said neutral connection of said phase windings, a second group of electric valves connected to said output terminals and to said other terminal of said field winding, and means for controlling said first mentioned group of electric valve means and said second group of valve means to control the energization of said field winding in accordance with a predetermined electrical condition.

3. In combination, a polyphase alternating current circuit, a dynamo-electric machine of the synchronous type having a plurality of phase windings connected to said circuit and provided with an electrical neutral connection, an associated core member and a relatively movable field winding having a pair of terminals one of which is connected to said neutral connection, a group of electric valve means each being connected to a different one of said phase windings and to the other terminal of said field winding, an inductive network comprising a plurality of windings connected to said phase windings and having output terminals for providing a system of voltages 180 electrical degrees out of phase with the terminal voltages of said phase windings and a neutral terminal connected to said neutral connection of said phase windings, a second group of electric valve means connected to said output terminals and said other terminal of said field winding, means for controlling said first mentioned group and said second group of electric valve means in accordance with the voltage of said phase windings to control the energization of said field winding within a predetermined range of current of said phase windings, and means for rendering said second group of electric valve means nonconductive when the current of said phase windings exceeds a predetermined value to cause said first mentioned group of electric valve means to establish a unidirectional component of current in said armature phase windings.

4. In combination, a polyphase alternating current circuit, a dynamo-electric machine of the synchronous type having a plurality of phase windings connected thereto and being provided with an electrical neutral connection, an associated core member and a relatively movable field winding having a pair of terminal connections one of which is connected to said neutral connection, a group of electric valve means each being connected to a different one of said phase windings and to the other terminal of said field winding for supplying direct current to said field winding through said neutral connection, an inductive network comprising a plurality of windings connected to said phase windings and having output terminals for providing a system of voltages 180 electrical degrees out of phase with the terminal voltages of said phase windings and a neutral terminal connected to said neutral connection of said phase windings, a second group of electric valve means interposed between said output terminals and said other terminal of said field winding, means for controlling said first mentioned group of electric valve means and said second group of electric valve means in accordance with the voltage of said phase windings within a predetermined range of the alternating component of current of said phase windings, means for continuously decreasing the conductivity of said second group of electric valve means within a second range of current of said armature winding to cause said first mentioned group of electric valve means to supply direct current to said armature phase windings through said field winding to control the magnetization of said core members in accordance with the armature current and for rendering said second group of electric valve means nonconductive when the alternating component of the current in said phase windings exceeds a predetermined value to increase the unidirectional component of current in said armature phase windings to a value sufficient to cause said machine to operate higher up on the saturation curve.

5. In combination, a polyphase alternating current circuit, a dynamo-electric machine of the synchronous type having a plurality of phase windings connected thereto and being provided with an electrical neutral connection, an associated core member and a relatively movable field winding having a pair of terminal connections one of which is connected to said neutral connection, a group of electric valve means each being connected to a different one of said phase windings and to the other terminal of said field winding for supplying direct current to said field winding through said neutral connection, said electric valve means being provided with control members for controlling the conductivity thereof, an inductive network comprising a plurality of windings connected to said phase windings and having output terminals for providing a system of voltages 180 electrical degrees out of phase with the terminal voltages of said phase windings and a neutral terminal connected to said neutral connection of said phase windings, a second group of electric valve means interposed between said output terminals and said other terminal of said field winding and each valve comprising a control member for controlling the conductivity thereof, and a control circuit for impressing alternating voltages variable in phase relative to the voltage of said phase windings on the control members of said first mentioned group of electric valve means to maintain substantially constant the voltage of said phase windings and for controlling the phase of the voltages impressed on the control members of said second group of electric valve means to control the component of unidirectional current in said phase windings in accordance with the alternating current of said phase windings.

6. In combination, an alternating current circuit, a dynamo-electric machine of the synchronous type having armature windings connected to said alternating current circuit, an associated core member and a relatively movable field winding, a group of electric valve means connected between said alternating current circuit and said field winding for supplying direct current thereto and each electric valve means comprising a control member for controlling the conductivity thereof, a second group of electric valve means interposed between said alternating current circuit and said field winding for supplying direct current thereto and each electric valve means comprising a control member for controlling the conductivity thereof, a control circuit comprising means for furnishing control voltages variable in phase for energizing said control members to maintain the voltage of said alternating current circuit at a substantially constant value within a predetermined range of current transfer between said armature windings and said alternating current circuit and for progressively retarding in phase the voltages impressed on the control members of said second group of electric valve means to decrease the conductivity thereof and for progressively advancing in phase the control voltages impressed on the control members of said first mentioned group of valves to control the voltage of said alternating current circuit by the energization of said field winding by said first mentioned group of valves for values of current transfer above said predetermined range, the respective groups of valves at any one time having different degrees of conductivity.

7. In combination, a dynamo-electric machine of the synchronous type having an armature winding provided with a neutral connection and a field winding having a pair of terminal connections one of which is connected to said neutral connection, electric valve means connected between said armature winding and the other terminal connection of said field winding for supplying direct current thereto, and means for controlling said electric valve means in accordance with the current of said armature winding.

8. In combination, a dynamo-electric machine having an armature winding provided with a neutral connection, an excitation means therefor including a field winding having a pair of terminal connections one of which is connected to said neutral connection, electric valve means connected between said armature winding and the other terminal of said field winding for controlling the energization of said field winding in accordance with the current of said armature winding, and voltage responsive means for additionally controlling the energization of said excitation means.

9. In combination, a dynamo-electric machine having an armature winding provided with a neutral connection and a field winding having a pair of terminal connections one of which is connected to said neutral connection, electric valve means connected between said armature winding and the other connection of said field winding for supplying direct current thereto, and means for controlling the conductivity of said electric valve means conjointly in accordance with the current and the voltage of said armature winding.

10. In combination, an alternating current circuit, an electrical network connected to said alternating current circuit and having a neutral connection, a group of electric valve means connected to said alternating current circuit and to said network, a second electrical network connected to said alternating current circuit for producing a system of alternating voltages displaced 180 electrical degrees relative to the voltages impressed on said electric valve means, said second network being provided with a neutral connection connected to the neutral connection of said first mentioned electrical network, a second group of electric valves connected to transmit current from said circuit to said second electrical network, and an excitation circuit for controlling the conductivities of both groups of electric valve means in accordance with a predetermined electrical condition of said alternating current circuit within a predetermined range of a second electrical condition of said alternating current circuit and means for controlling the conductivity of one of said groups of electric valve means predominately in accordance with said second electrical condition when said second electrical condition exceeds said predetermined range to establish in said first mentioned electrical network a current having a substantial unidirectional component.

ELMO E. MOYER.